Feb. 6, 1923.

P. J. NASH.
DIRIGIBLE HEADLIGHT.
FILED APR. 12, 1922.

1,444,518.

2 SHEETS—SHEET 1.

WITNESSES

Inventor
Phineas J. NASH

By Richard B. Owen
Attorney

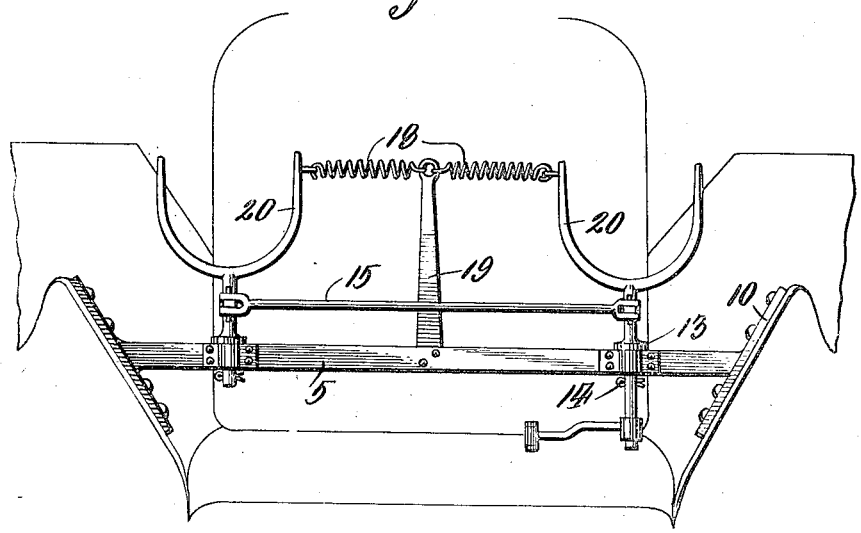
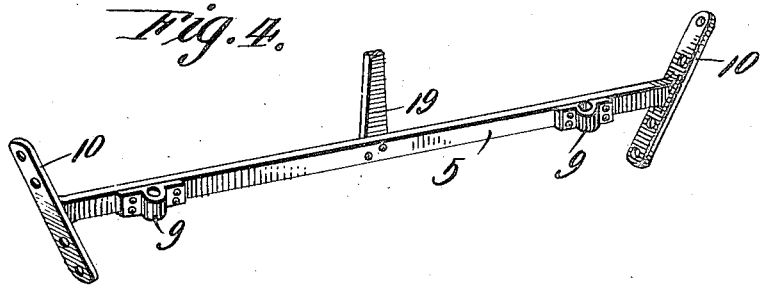

Patented Feb. 6, 1923.

1,444,518

UNITED STATES PATENT OFFICE.

PHINEAS J. NASH, OF RIDGEWAY, COLORADO.

DIRIGIBLE HEADLIGHT.

Application filed April 12, 1922. Serial No. 551,910.

*To all whom it may concern:*

Be it known that I, PHINEAS J. NASH, a citizen of the United States, residing at Ridgeway, in the county of Ouray and State of Colorado, have invented certain new and useful Improvements in Dirigible Headlights, of which the following is a specification.

This invention relates to new and useful improvements in dirigible headlights particularly adapted for use on motor vehicles, the primary object of the invention being to provide means for manually turning the headlights from side to side whereby the driver of the vehicle can turn the headlights at will, and when the driver deems it necessary to turn the lights, to signal or illuminate the road.

Another important object of the invention is to provide a simple arrangement whereby the headlights can be turned simultaneously and will automatically return to their normal position to cast light longitudinally in front of the vehicle.

A further object of the invention resides in the provision of a simple and inexpensive means for mounting the lights whereby the invention can be easily applied to any make of motor vehicle.

A still further object of the invention is to provide a simple and efficient pedal for controlling the movement of the lights, which requires the minimum amount of exertion on the part of the operator to control the device.

Other objects and advantages of the invention will become apparent during the course of the following description.

Figure 1:
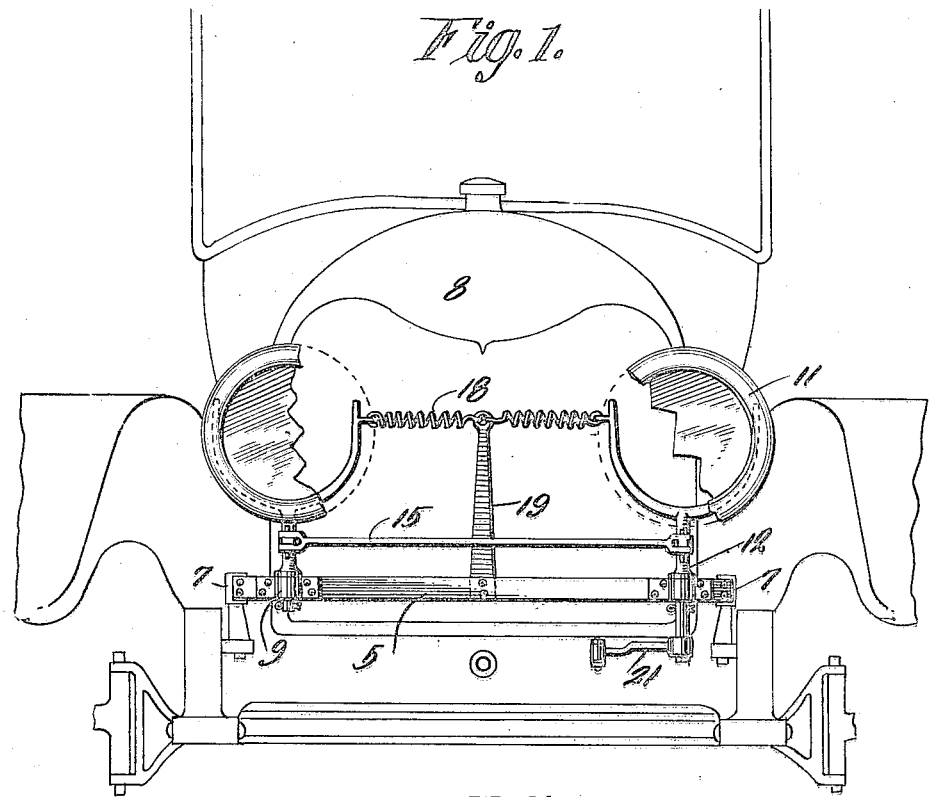
Figure 2:
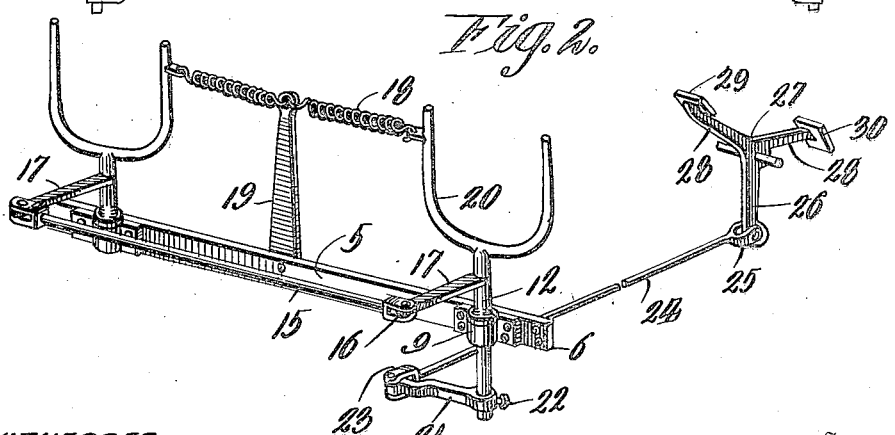

In the accompanying drawings forming a part of the description and wherein like numerals are employed to designate like parts throughout the several views, Figure 1 is a fragmentary front elevation of a motor vehicle with the invention applied thereto, Figure 2 is a perspective view of the invention, Figure 3 is a fragmentary front elevation of a motor vehicle with the invention applied thereto, and showing a modified form of light support, and Figure 4 is a perspective view of a modified form of the light support.

In the drawings, wherein for the purpose of illustration is shown the preferred embodiment of my invention, the numeral 5 designates the lamp support, which shown in Figs. 1 and 2 consists of an elongated flat bar having its ends apertured as at 6 for attachment to the front 7 of a motor vehicle, so that the lamp support extends transversely of the vehicle slightly in advance of the front of the radiator 8. A plate 9 is fastened at opposite ends to the forward face of the bar 5 adjacent each end thereof, and the intermediate portion of this plate is curved outwardly to provide the supporting bar 5 at each end with a socket as shown. In the modified form of lamp support 5 illustrated in Figs. 3 and 4, means are provided for attaching the support to the fenders of a vehicle. This means consists in providing each end of the bar 5 with an inclined plate 10 which is suitably apertured for the passage of bolts or rivets for attaching the plates to the fenders. As seen, the plates 10 are arranged in downwardly converging relationship and are secured intermediate of their ends to the supporting bar 5 so that the plates extend above and below the bar.

As the invention shown in all of the figures is the same in other respects, a description of one will suffice for both. The headlights 11 may be of any desired type and are supported on the bar 5 by posts or spindles 12 extending through the sockets provided in the bar 5. These spindles 12 are equipped with shoulders 13 adapted to rest upon the tops of the sockets so as to properly support the headlights upon the supporting bar. A cotter pin 14 is extended through each spindle directly below the supporting bar so as to prevent accidental vertical movement of the spindles in their sockets. One of these lamp spindles terminates directly below the supporting bar, while the other spindle is extended a substantial distance below the bar as clearly shown. The two spindles 12 are caused to move simultaneously by a connecting rod 13 which has its ends pivotally connected as at 16 to the free ends of arms 17 carried by the spindles and extending forwardly thereof.

The headlights are normally retained in their normal position by a pair of coiled springs 18 and are automatically returned to their normal positions after being turned by these springs. The inner ends of these springs are connected to a stationary object on the vehicle, and in the present instance are connected to the apertured upper end of arm 19 having its lower end secured to the intermediate portion of the supporting bar 5. This arm is arranged equi-distant between the lamp spindles 12 and the coil springs 18 extend from opposite sides of the arm to be connected at their outer ends to their respective lamp supports 20 which are carried by the upper ends of the spindles 12.

As stated before, the lower end of one of the spindles 12 extends a substantial distance below the supporting bar 5 and has secured thereto a laterally projecting arm 21 which is provided at one end with an opening to be received on the lower end of the spindle, a set screw 22 being threaded into this end of the arm for fastening the same to the spindle. The outer end of this arm 21 is provided with a vertical opening so as to receive a pin carried by the forward forked end 23 of a control rod 24. The rear end of this rod 24 is also forked as at 25, it being noted that the two forks of the rod are arranged at right angles to each other. The rear fork 25 is pivotally connected to a depending leg 26 of a Y-shaped foot pedal 27 which is pivotally mounted on the floor board of the vehicle adjacent the driver's seat. The upper end of the leg 26 is provided with a pair of upwardly diverging arms 28 which are adapted to be disposed above the floor board, and the arm which is arranged foremost of the vehicle is provided with a plate 29 while the other arm is equipped with a downwardly inclined heel plate 30 so that the driver of the vehicle may conveniently manipulate the pedal.

In operation, when the driver is about to make a left hand turn at night, and when the lamps 11 are lighted, the pedal 27 is depressed forwardly by exerting more pressure on the toe plate 29 so as to cause the depending leg 26 of the pedal to move rearwardly and to carry the operating rod 24 therewith. This movement of the rod will cause the spindles 12 to turn to the left through the intermediacy of the arm 21 and connecting rod 15 so that the lamps 11 will turn toward the left side of the vehicle to illuminate the left hand side of the road. After the turn has been completed the driver simply releases pressure on the toe plate 29 so as to permit the springs 18 which have been stretched by the lamps turning to automatically return them to their normal position.

If desired, the headlights may be used in the capacity of direction indicators by being operated to shed their lights in whichever direction the driver contemplates turning before the turn has actually been made. By manipulating the lamps in this manner, traffic will be cautioned as to the contemplated movement of the vehicle prior to its execution thereof.

The foregoing description and accompanying drawings have reference to what might be considered to be the approved form of my invention. I desire it to be understood that I may make changes in the construction, combination and arrangement of parts, materials, dimensions, etc., as may prove expedient and fall within the scope of the appended claim.

Having thus described and illustrated my invention what I claim is:—

Dirigible headlights comprising a headlight supporting bar extending transversely of a vehicle and having its ends secured thereto, a vertical socket mounted on the bar adjacent each end thereof, a lamp spindle mounted in each socket and having lamp supporting means, an arm secured to the intermediate portion of the supporting bar and extending upwardly thereof, and coiled springs having their inner end secured to the upper ends of said arm, and their outer ends secured to their respective lamp supporting means of the spindle.

In testimony whereof I affix my signature in presence of two witnesses.

PHINEAS J. NASH.

Witnesses:
R. E. ISRAEL,
LEON J. GIBSON.